United States Patent [19]

Azuma et al.

[11] Patent Number: 4,843,206
[45] Date of Patent: Jun. 27, 1989

[54] RESISTANCE WELDING ELECTRODE CHIP

[75] Inventors: Kazuo Azuma, Toyota; Masahiko Inoue, Aichi, both of Japan

[73] Assignee: Toyota Jidosha Kabushiki Kaisha, Japan

[21] Appl. No.: 245,173

[22] Filed: Sep. 15, 1988

[30] Foreign Application Priority Data

Sep. 22, 1987 [JP] Japan ................................ 62-237631

[51] Int. Cl.$^4$ ............................................. B23K 35/22
[52] U.S. Cl. .................................................... 219/119
[58] Field of Search ...................... 219/119, 118, 117.1

[56] References Cited

U.S. PATENT DOCUMENTS 4,071,947  2/1978  Nippert ............................... 219/119

FOREIGN PATENT DOCUMENTS

| | | |
|---|---|---|
| 47-38856 | 2/1972 | Japan . |
| 55-144386 | 11/1980 | Japan . |
| 58-100986 | 6/1983 | Japan . |
| 60-227998 | 11/1985 | Japan . |
| 60-231596 | 11/1985 | Japan . |
| 60-231597 | 11/1985 | Japan . |

Primary Examiner—Clifford C. Shaw
Attorney, Agent, or Firm—Finnegan, Henderson, Farabow, Garrett & Dunner

[57] ABSTRACT

A welding resistance electrode chip of this invention comprises a front end to be brought into contact with a substance to be welded, an intermediate cylinder disposed on and in contact with the tail end of front end, and a main cylinder having a closed end disposed on and in contact with the tail end of front end and the tail end and the inner wall of intermediate cylinder. It is sintered and molded out of appropriate copper-based powder materials respectively satisfying the requirements of portions thereof: The front end is made of a powder material having good thermal shock resistance and wear resistance, the intermediate cylinder is made of a powder material having high tenacity to suppress the deformation of the front end, and the main cylinder is made of a powder material having high conductivity. Therefore, the durability of resistance welding electrode chip of this invention has been improved remarkably, and the operation rate of equipment has been improved.

20 Claims, 4 Drawing Sheets (PRIOR ART)

RESISTANCE WELDING ELECTRODE CHIP

BACKGROUND OF THE INVENTION

1. Field of the Invention

This invention relates to a resistance welding electrode chip, and more particularly to a resistance welding electrode chip having improved durability.

2. Description of the Prior Arts

The conventional spot welding electrode chips have a configuration as shown in FIG. 6, and are made of a copper based alloy like a chromium-copper alloy and a beryllium-copper alloy. A special type of the conventional electrode chips is shown in FIG. 7, and has a dispersion strengthened copper alloy insert 100 having good durability buried at the front end.

And as set forth in Japanese Unexamined Patent Publication No. 38856/1972, a resistance welding electrode chip made of a titanium carbide-copper-molybdenum sintered alloy has been known, which contains molybdenum from 0.8 to 1.5% by weight to improve the durability, and titanium carbide from 25 to 40% by volume, or equivalent to from 16 to 31% by weight, to improve the thermal shock resistance.

Another resistance welding electrode chip as disclosed in Japanese Unexamined Patent Publication No. 100986/1983 has been known. It is sintered and molded of a composite material. The composite material is composed of a carbon powder or fiber plated with copper.

Further, there has been a resistance welding electrode chip having a front end made of a composite material having wear resistance, i.e. copper or copper based alloy and a carbon fiber, as set forth in Japanese Unexamined Patent Publication No. 144386/1980.

Furthermore, as set forth in Japanese Unexamined Patent Publication Nos. 227998/1985, 231596/1985 and 231597/1985 and shown in FIG. 8, there has been a resistance welding electrode chip having a wear resistance protective surface coat 200 formed thereon.

When spot welding plain mild steel plates with the prior art electrode chips as shown in FIG. 6, the front ends of the electrode chips are softened and deformed by the high temperature, thus the area of the front ends of the electrode chips increases and the electric current density at the front ends of the electrode chips decreases. As a result, a failure welding often occurs at 5000 to 8000 times of spot welding, and the electrode chips must be re-molded. And when spot welding zinc-plated steel plates with the prior art electrode chips, the copper of electrode chips and the zinc of zinc-plated steel plates are alloyed, and the front ends of electrode chips heavily wear in a degree of 5 to 10 times that of spot welding the plain mild steel plates. Consequently, the front ends of electrode chips must be machined and ground frequently. In addition, the front ends of the electrode chips wear much more heavily when spot welding the plain mild steel plates and the zinc-plated steel plates in turn.

The resistance welding electrode chip as set forth in Japanese Unexamined Patent Publication No. 38856/1972 has a short life. As the whole electrode chip is made of the wear resistance material, the portions adjacent the front end exhibit poor electric conductivity and at which a greater amount of heat generates during the application of electric power. Thus, the strength of the portions adjacent the front end decreases sharply and deforms inevitably. And the resistance welding electrode chip as set forth in Japanese Unexamined Patent Publication No. 100986/1983 has the same problem.

Further, although the resistance welding electrode chip disclosed in Japanese Unexamined Patent Publication No. 144386/1982 has the insert 100 (FIG. 7) made of the wear resistance material and buried at the front end thereof, the insert 100 comes off or even breaks.

Furthermore, the resistance welding electrode chips of Japanese Unexamined Patent Publication Nos. 227998/1985, 231596/1985 and 231597/1985 have the surface coated with the protective surface coat 200 (FIG. 8) made of the wear resistance material, but the protective surface coat 200 comes off during the resistance welding. And it comes off also during regrinding the electrode chips to a desired front end shape.

Finally, it requires an increased number of manufacturing processes to manufacture the resistance welding chips of Japanese Unexamined Patent Publication Nos. 144386/1980, and 227998/1985, 231596/1985 and 231597/1985, respectively shown in FIGS. 7 and 8. Accordingly, they are expensive, but have problems as mentioned above.

SUMMARY OF THE INVENTION

It is therefore an object of this invention to overcome the drawbacks of the prior art resistance welding electrode chips. And it is another object of this invention to provide a resistance welding electrode chip with improved durability molded out of a plurality of powder materials which are provided for portions of the resistance welding electrode chips varying in performance requirements.

A welding resistance electrode chip of this invention comprises a front end to be brought into contact with a substance to be welded, an intermediate cylinder disposed on and in contact with the tail end of front end, and a main cylinder having a closed end disposed on and in contact with the tail end of front end and the tail end and the inner wall of intermediate cylinder.

The front end is made of a mixed powder material of at least one conductive ceramic powder selected from a group consisting of titanium carbide (TiC) powder, zirconium carbide (ZrC) powder, hafnium carbide (HfC) powder, tantalum carbide (TaC) powder, niobium carbide (NbC) powder, tungsten carbide (WC) powder, chromium carbide ($Cr_3C_2$) powder, titanium nitride (TiN) powder, and niobium nitride (NbN) powder, and at least one of copper powder and copper alloy powder.

The intermediate cylinder is made of a mixed powder material of at least one powder material selected from a group consisting of zirconium boride ($ZrB_2$) powder, titanium boride ($TiB_2$) powder, tungsten carbide powder (WC) and molybdenum (Mo) metal powder, and at least one of copper powder and copper alloy powder.

The main cylinder is made of at least one of copper powder and copper alloy powder.

Further, these powder materials are disposed at their respective places, sintered integrally, and molded into a resistance welding electrode chip.

And as for the copper alloy powder, the following may be used: chromium-copper alloy powder, titanium-copper alloy powder, and beryllium-copper alloy powder.

Moreover, when molding the resistance welding electrode chip of this invention, pores for cooling may be formed in the inner wall and the bottom of main cylinder adjacent the front end in order to make the resistance welding electrode chip more likely to be cooled.

Thus, the resistance welding electrode chip of this invention is sintered and molded out of appropriate copper-based powder materials respectively satisfying the requirements of portions thereof: The front end is made of a powder material having good thermal shock resistance and wear resistance, the intermediate cylinder is made of a powder material having high tenacity to suppress the deformation of the front end, and the main cylinder is made of a powder material having high conductivity. Accordingly, the powder materials meet all the requirements of portions of resistance welding electrode chip.

Therefore, the durability of resistance welding electrode chip of this invention has been improved remarkably, since the resistance welding electrode chip is sintered and molded out of appropriate copper-based powder materials respectively satisfying the requirements of portions thereof.

As a result, the resistance welding electrode chip of this invention has come to offer high durability. No such durability has been achieved by the resistance welding electrode chips of prior art, i.e. the electrode chip made uniformly of a chromium-copper or beryllium-copper alloy, the electrode chip having the insert 100 buried at the front end, and the electrode chip coated with the protective surface coat 200. Accordingly, the idle time of equipment, for instance an automobile body spot welding line's idle time due to the electrode chip grinding, has been decreased greatly, and thus the operation rate of equipment has been allowed to improve.

Furthermore, the automobile body made of the zinc-plated steel plates having high corrosion resistance can be welded with ease, since the spot welding using the electrode chip of this invention produces the same quality whether the substance to be welded is the zinc-plated steel plate or the plain mild steel plate.

BRIEF DESCRIPTION OF THE DRAWINGS

The above and other objects, features and advantages of this invention will become fully apparent from the following description taken in conjunction with accompanying drawings, in which.

DETAILED DESCRIPTION OF THE PREFERRED EMBODIMENTS

The present invention will be hereinafter described with reference to a preferred embodiment.

First Preferred Embodiment

Figure 1:
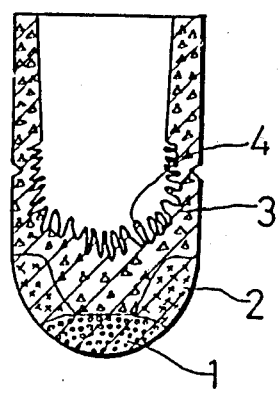
FIG. 1 is a schematic sectional view of a resistance welding electrode chip of a first preferred embodiment according to this invention.
Figure 2:
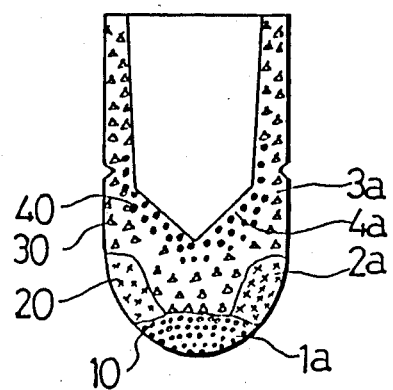
FIG. 2 is a schematic sectional view of the resistance welding electrode chip of the first preferred embodiment according to this invention before sintering.
Figure 9:
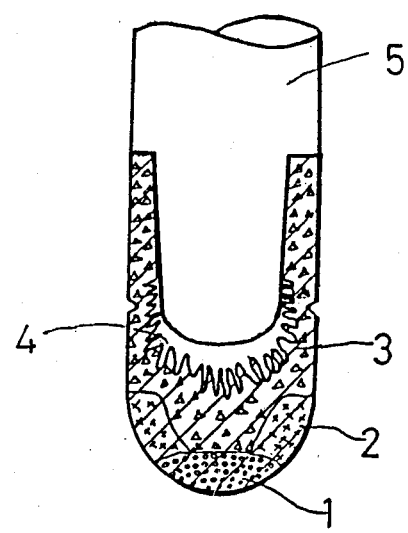
FIG. 9 is a schematic sectional view illustrating how a resistance welding electrode chip according to this invention is installed to an electrode.

FIG. 1 illustrates a resistance welding electrode chip of a first preferred embodiment. The electrode chip comprises a front end 1, an intermediate cylinder 2, and a main cylinder 3. The front end 1 is rounded at the front as illustrated in FIG. 1, and is brought into contact with substances to be welded. The intermediate cylinder 2 is disposed on and in contact with the tail end of the front end 1. And the main cylinder 3 is disposed on and in contact with the tail end of front end 1, and in contact with the tail end and the inner wall of intermediate cylinder 2, and has a closed end. Further, the main cylinder 3 has pores 4 formed in the inner wall and the bottom thereof adjacent the front end 1. The resistance welding electrode chip of the first preferred embodiment is installed to an electrode 5 as illustrated in FIG. 9.

The front end 1 was made of a mixed powder material containing from 10 to 20% by weight of at least one of titanium carbide (TiC), zirconium carbide (ZrC), hafnium carbide (HfC), tantalum carbide (TaC), niobium carbide (NbC), tungsten carbide (WC), chromium carbide ($Cr_3C_2$), titanium nitride (TiN), and niobium nitride (NbN) powder mixed with a base powder containing copper or chromium-copper alloy powder. The intermediate cylinder 2 was made of a mixed powder material containing 20% by weight of at least one of zirconium boride ($ZrB_2$), titanium boride ($TiB_2$), tungsten carbide (WC), and molybdenum (Mo) metal powder mixed with a base powder containing copper or chromium-copper alloy powder. Further, the main cylinder 3 was made of either copper or chromium-copper alloy powder. The front end 1, the intermediate cylinder 2 and the main cylinder 3 were sintered and molded integrally into the electrode chip of the first preferred embodiment according to this invention.

The resistance welding electrode chip of the first preferred embodiment according to this invention was produced by the following processes: First, the mixed powder materials 10 and 20, and the powder materials 30 and 40 were provided respectively at portions 1a, 2a, 3a and 4a in a cavity of mold for molding the electrode chip. Specifically, a mixed powder material 10 containing 20% by weight of tungsten carbide (WC) powder mixed with chromium-copper alloy powder was provided at the portion 1a of mold cavity for molding the front end 1, a mixed powder material 20 containing 20% by weight of zirconium boride ($ZrB_2$) powder mixed with copper powder is provided at the portion 2a of mold cavity for molding the intermediate cylinder 2, a powder material 30 containing copper powder was provided at the portion 3a of mold cavity for molding the main cylinder 3, and a powder material 40 containing lead (Pb) powder was provided at the portion 4a of mold cavity for molding the pores 4. And then, the powder materials were compacted preparatorily in the mold under a pressure of 10 kgf/mm². Further, the substance thus compacted was sintered in the mold under a pressure of 20 to 30 kgf/mm² at a temperature of about 900° to 950° C. for 1 hour, and thereby the powder material 40 containing the lead powder vaporized to form the pores 4 in the inner wall and the bottom of the main cylinder 3 thereof adjacent the front end 1.

In addition, a comparative electrode chip having the same configuration as that of the electrode chip of the first preferred embodiment was produced out of chromium-copper alloy powder only in order to evaluate the performance of electrode chip of the first preferred embodiment.

(Evaluation)

Zinc-plated steel plates were spot-welded with the electrode chips of the first preferred embodiment, and then with the comparative electrode chips under the following conditions:

Welding Current: 10500 A
Squeeze Time: 30 cycles per second
Weld Time: 12 cycles per second
Hold Time: 1 cycle per second
Pressurizing force: 200 kgf When performing the spot welding with the comparative electrode chips, a failure welding occurred at 2000 times of spot welding. But when performing the spot welding with the electrode chips of the first preferred embodiment, no failure welding occurred at that time and the spot welding had been performed favorably until 4000 times of spot welding.

In addition to the simple spot welding, zinc-plated steel plates and plain mild steel plates were spot-welded in turn under the conditions described above. This type of spot welding wears the electrode chips most. When performing this spot welding with the comparative electrode chips, a failure welding occurred at 600 times of spot welding. But when performing this spot welding with the electrode chips of the first preferred embodiment, no failure occurred until 2000 times of spot welding.

Thus, the resistance welding electrode chip of the first preferred embodiment according to this invention came to have remarkably improved durability, since the employed powder materials respectively met the requirements of portions of resistance welding electrode chip: The front end 1 was made of the mixed powder material having good thermal shock resistance and wear resistance, the intermediate cylinder 2 was made of the mixed powder having high tenacity, and the main cylinder 3 was made of the powder material having high conductivity. As a result, the intervals between the electrode chip exchange were allowed to extend. Further, in the electrode chip of this first preferred embodiment, the pores 4 formed in the inner wall and the bottom of the main cylinder 3 adjacent the front end 1 helped increase the cooling effect of the coolant.

Second Preferred Embodiment

This second preferred embodiment is an application of a resistance welding electrode chip of this invention to a seam welding electrode. A seam welding is a continuous spot welding in which substances to be welded are held and welded between disk-shaped electrodes. The disk-shaped electrodes turn to apply voltage and pressure to the substance.

Figure 4:
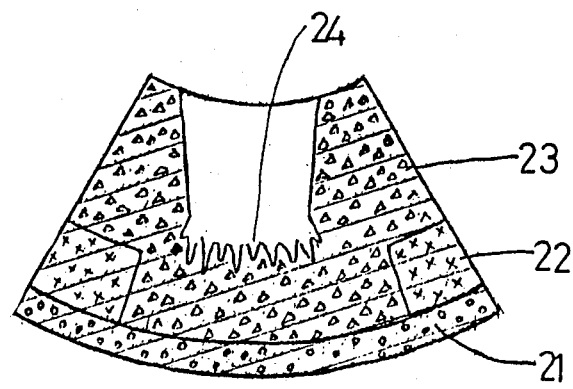
FIG. 4 is a schematic sectional view of a resistance welding electrode chip of a second preferred embodiment according to this invention.

FIG. 4 illustrates a resistance welding electrode chip of the second preferred embodiment according to this invention for seam welding electrode. The electrode chip for seam welding electrode has a sector configuration, and comprises a front end 21, an intermediate cylinder 22, and a main cylinder 23.

The front end 21 forms the rim of sector configuration, and is brought into contact with substances to be welded.

The intermediate cylinder 22 has curved surfaces at the head and tail ends thereof, and is disposed on and in contact with the tail end of front end 21.

The main cylinder 23 has a closed end, shoulder portions, and curved surfaces at the head and tail ends thereof. The closed end or the curved surfaces at the head end thereof is disposed on and in contact with the tail end of front end 21. The shoulder portions are disposed on and in contact with the tail end and the inner wall of intermediate cylinder 22. In other words, the intermediate cylinder 22 is disposed on the shoulder portions of main cylinder 23 while surrounding the closed end of main cylinder 23. Further, the main cylinder 23 has pores 24 formed in the inner wall and the bottom thereof adjacent the front end 21.

Figure 5:
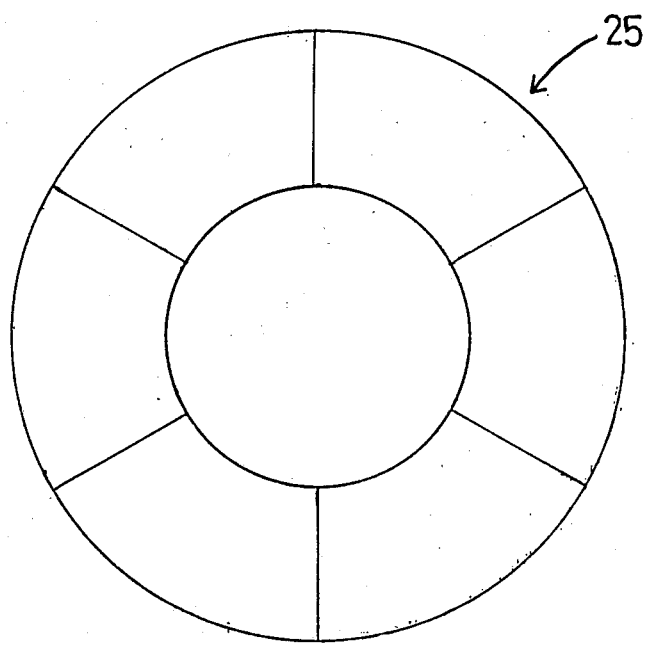
FIG. 5 is a schematic plan view of an electrode roller, applicable to seam welding, assembling six of the resistance welding electrode chips of the second preferred embodiment according to this invention.
Figure 6:
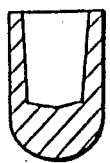
FIG. 6 is a schematic sectional view of a prior art resistance welding electrode chip.
Figure 7:
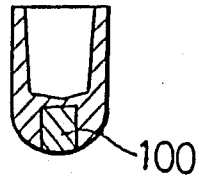
FIG. 7 is a schematic sectional view of another prior art resistance welding electrode chip in which an insert is buried at the front end.
Figure 8:
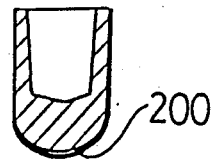
FIG. 8 is a schematic sectional view of still another prior art resistance welding electrode chip whose surface is covered with a protective surface coat.

Six of these electrode chips were assembled into a disk-shaped seam welding electrode 20 as shown in FIG. 5. The front end 21, the intermediate cylinder 22 and the main cylinder 23 were respectively made of the same powder materials as those of the front end 1, the intermediate cylinder 2 and the main cylinder 3 of the first preferred embodiment. Thus, the seam welding electrode 20 of the second preferred embodiment provides the same advantages as provided by the first preferred embodiment.

The way of producing the seam welding electrode 20 is not limited to the way described above. Namely, the disk-shaped seam welding electrode 20 may be integrally molded out of the same powder materials as those of the first preferred embodiment after appropriately disposing the powder materials at the predetermined places.

This invention is not limited to the preferred embodiments described above. Many variations may be devised within the scope of this invention.

Figure 3:
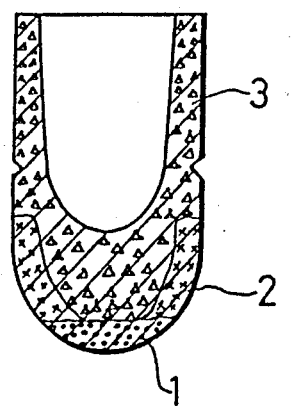
FIG. 3 is a schematic sectional view of a modification of the first preferred embodiment according to this invention in which no pores are formed inside a main cylinder.

In case of the spot welding, the resistance welding electrode chip according to this invention may preferably be formed into the rod shape, but it may be formed into any configuration as far as it is applicable to the spot welding. And the diameter, the length and the front end configuration of electrode chip may be determined depending on welding machines, to which the electrode chip is mounted, substances to be welded and so on. Especially, the front end configuration may be rounded, tapered or flattened. Further, the resistance electrode chip may not include the pores 4 as shown in FIG. 3. Furthermore, the size and the configuration of intermediate cylinder and main cylinder are not limited to those of the preferred embodiments as described above, and they may be varied depending on specific purposes and applications.

What is claimed is:

1. A resistant welding electrode chip comprising:
   a front end to be brought into contact with a substance to be welded;
   an intermediate cylinder disposed on and in contact with the tail end of said front end; and
   a main cylinder having a closed end disposed on and in contact with the tail end of said front end and the tail end and the inner wall of said intermediate cylinder, wherein said front end is made of a mixed powder material of at least one conductive ceramic powder selected from a group consisting of titanium carbide (TiC) powder, zirconium carbide (ZrC) powder, hafnium carbide (HfC) powder, tantalum carbide (TaC) powder, niobium carbide (NbC) powder, tungsten carbide (WC) powder, chromium carbide ($Cr_3C_2$) powder, titanium nitride (TiN) and niobium nitride (NbN), and at least one of copper powder and copper alloy powder;

said intermediate cylinder is made of a mixed powder material of at least one powder material selected from a group consisting of zirconium boride ($ZrB_2$) powder, titanium boride ($TiB_2$) powder, tungsten carbide powder (WC) and molybdenum (Mo) metal powder, and at least one of copper powder and copper alloy powder; and said main cylinder is made of at least one of copper powder and copper alloy powder.

2. A resistance electrode according to claim 1, wherein
said powder materials are disposed at their respective places of a mold for molding a resistance welding electrode chip, sintered integrally, and molded into a resistance welding electrode chip.

3. A resistance welding electrode chip according to claim 1, wherein said copper alloy powder is at least one selected from a group consisting of chromium-copper alloy powder, titanium-copper alloy powder, and beryllium-copper alloy powder.

4. A resistance welding electrode chip according to claim 3, wherein said copper alloy powder is chromium-copper alloy.

5. A resistance welding electrode chip according to claim 1, wherein said main cylinder has pores formed in the inner wall and the bottom of said main cylinder adjacent said front end for making a resistance welding electrode chip more likely to be cooled.

6. A resistance welding electrode chip according to claim 1, wherein said main cylinder further includes lead (Pb) powder for forming pores in the inner wall and the bottom of said main cylinder adjacent said front end for making a resistance welding electrode chip more likely to be cooled.

7. A resistance welding electrode chip according to claim 1, wherein said resistance welding electrode chip has a sector shape.

8. A resistance welding electrode chip according to claim 1, wherein said resistance welding electrode chip is a resistance welding electrode and has a disk shape.

9. A resistant welding electrode chip comprising:
a front end to be brought into contact with a substance to be welded;
an intermediate cylinder disposed on and in contact with the tail end of said front end; and
a main cylinder having a closed end disposed on and in contact with the tail end of said front end and the tail end and the inner wall of said intermediate cylinder, wherein
said front end is made of a mixed powder material containing from 10 to 20% by weight of at least one powder material selected from a group consisting of titanium carbide (TiC) powder, zirconium carbide (ZrC) powder, hafnium carbide (HfC) powder, tantalum carbide (TaC) powder, niobium carbide (NbC) powder, tungsten carbide (WC) powder, chromium carbide ($Cr_3C_2$) powder, titanium nitride (TiN) and niobium nitride (NbN) mixed with base powder containing at least one of copper powder and chromium-copper alloy powder;

said intermediate cylinder is made of a mixed powder material containing 20% by weight of at least one powder material selected from a group consisting of zirconium boride ($ZrB_2$) powder, titanium boride ($TiB_2$) powder, tungsten carbide (WC) powder and molybdenum (Mo) metal powder mixed with base powder containing at least one of copper powder and chromium-copper alloy powder; and said main cylinder is made of at least one copper powder and chromium-copper alloy powder.

10. A resistance welding electrode chip according to claim 9, wherein
said powder materials are disposed at their respective places of a mold for molding a resistance welding electrode chip, sintered integrally, and molded into a resistance welding electrode chip.

11. A resistance welding electrode chip according to claim 9, wherein said main cylinder has pores formed in the inner wall and the bottom of said main cylinder adjacent said front end for making a resistance welding electrode chip more likely to be cooled.

12. A resistance welding electrode chip according to claim 9, wherein said main cylinder further includes lead (Pb) powder for forming pores in the inner wall and the bottom of said main cylinder adjacent said front end for making a resistance welding electrode chip more likely to be cooled.

13. A resistance welding electrode chip according to claim 9, wherein said resistance welding electrode chip has a sector shape.

14. A resistance welding electrode chip according to claim 9, wherein said resistance welding electrode chip is a resistance welding electrode and has a disk shape.

15. A resistant welding electrode chip comprising:
a front end to be brought into contact with a substance to be welded;
an intermediate cylinder disposed on and in contact with the tail end of said front end; and
a main cylinder having a closed end disposed on and in contact with the tail end of said front end and the tail end and the inner wall of said intermediate cylinder, wherein
said front end is made of a mixed powder material containing 20% by weight of tungsten carbide (WC) powder mixed with chromium-copper alloy powder;
said intermediate cylinder is made of a mixed powder material containing 20% by weight of zirconium boride ($ZrB_2$) powder mixed with copper powder; and
said main cylinder is made of copper powder.

16. A resistance welding electrode chip according to claim 15, wherein
said powder materials are disposed at their respective places of a mold for molding a resistance welding electrode chip, sintered integrally, and molded into a resistance welding electrode chip.

17. A resistance welding electrode chip according to claim 15, wherein said main cylinder has pores formed in the inner wall and the bottom of said main cylinder adjacent said front end for making a resistance welding electrode chip more likely to be cooled.

18. A resistance welding electrode chip according to claim 15, wherein said main cylinder further includes lead (Pb) powder for forming pores in the inner wall and the bottom of said main cylinder adjacent said front end for making a resistance welding electrode chip more likely to be cooled.

19. A resistance welding electrode chip according to claim 15, wherein said resistance welding electrode chip has a sector shape.

20. A resistance welding electrode chip according to claim 15, wherein said resistance welding electrode chip is a resistance welding electrode and has a disk shape.

* * * * *

UNITED STATES PATENT AND TRADEMARK OFFICE
CERTIFICATE OF CORRECTION

PATENT NO. : 4,843,206

DATED : June 27, 1989

INVENTOR(S) : Azuma et al.

It is certified that error appears in the above-identified patent and that said Letters Patent is hereby corrected as shown below:

Column 5, line 4, "950° C." should read --950° C--.

Column 5, line 50, "powder having" should read --powder material having--.

Column 5, line 66, "substance" should read --substances--.

Column 8, line 12, "one copper" should read --one of copper--.

Signed and Sealed this

Twenty-ninth Day of May, 1990

Attest:

HARRY F. MANBECK, JR.

*Attesting Officer*   *Commissioner of Patents and Trademarks*